(12) United States Patent
Hemphill et al.

(10) Patent No.: US 11,114,905 B2
(45) Date of Patent: Sep. 7, 2021

(54) PRIMARY ASSEMBLY FOR USE IN A WIRELESS POWER TRANSMISSION SYSTEM, POSITIONING SYSTEM, AND METHOD OF DETERMINING A DISTANCE BETWEEN A PRIMARY ASSEMBLY AND A SECONDARY ASSEMBLY

(71) Applicant: TDK Corporation, Tokyo (JP)

(72) Inventors: Hugh Hemphill, Solothurn (CH); Pierre Fechting, Zurich (CH)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/632,283

(22) PCT Filed: Jul. 20, 2017

(86) PCT No.: PCT/EP2017/068384
§ 371 (c)(1),
(2) Date: Jan. 17, 2020

(87) PCT Pub. No.: WO2019/015759
PCT Pub. Date: Jan. 24, 2019

(65) Prior Publication Data
US 2020/0259375 A1    Aug. 13, 2020

(51) Int. Cl.
*H02J 50/90* (2016.01)
*H02J 50/10* (2016.01)
(Continued)

(52) U.S. Cl.
CPC .............. *H02J 50/90* (2016.02); *B60L 53/12* (2019.02); *B60L 53/36* (2019.02); *B60L 53/38* (2019.02); *H02J 50/10* (2016.02)

(58) Field of Classification Search
CPC combination set(s) only.
See application file for complete search history.

(56) References Cited

U.S. PATENT DOCUMENTS 9,656,559 B2    5/2017 Konno et al.
10,622,846 B2 *  4/2020 Seong ..................... B60L 53/38
(Continued)

FOREIGN PATENT DOCUMENTS

EP    3157128 A1    4/2017
JP    2012249403    12/2012
(Continued)

OTHER PUBLICATIONS

SAE International, "Wireless Power Transfer for Light-Duty Plug-In / Electric Vehicles and Alignment Methodology," http://standards.sae.org/wip/j2954/, Jul. 20, 2017, pp. 1.

*Primary Examiner* — Adam D Houston
(74) *Attorney, Agent, or Firm* — Slater Matsil, LLP (57) ABSTRACT

A primary assembly, a positioning system and a method for determining a distance between a primary assembly and a secondary assembly are disclosed. In an embodiment, a primary assembly for a wireless power transmission system includes a first antenna and a second antenna, wherein the first antenna is configured to determine a distance between the first antenna and a circuit component of a secondary assembly for the wireless power transmission system, and wherein the second antenna is configured to determine a distance between the second antenna and the circuit component of the secondary assembly.

20 Claims, 4 Drawing Sheets

(51) Int. Cl.
   *B60L 53/12* (2019.01)
   *B60L 53/36* (2019.01)
   *B60L 53/38* (2019.01)

(56) References Cited

U.S. PATENT DOCUMENTS

| | | | |
|---|---|---|---|
| 2005/0170778 A1* | 8/2005 | Uchiyama | G06F 3/038 455/41.2 |
| 2009/0079426 A1* | 3/2009 | Anderson | G01R 31/31709 324/301 |
| 2010/0277121 A1* | 11/2010 | Hall | B60L 53/66 320/108 |
| 2010/0295378 A1* | 11/2010 | Suzuki | H02J 7/025 307/104 |
| 2013/0234503 A1* | 9/2013 | Ichikawa | H02J 7/00712 307/9.1 |
| 2015/0094887 A1 | 4/2015 | Kawashima | |
| 2016/0380487 A1 | 12/2016 | Widmer et al. | |
| 2017/0008410 A1 | 1/2017 | Krammer et al. | |
| 2017/0111088 A1* | 4/2017 | Seong | H02J 50/10 |
| 2018/0262894 A1* | 9/2018 | Daoura | H04L 67/02 |
| 2019/0199138 A1* | 6/2019 | Lee | H02J 7/025 |
| 2019/0293703 A1* | 9/2019 | Romanow | G01R 29/10 |
| 2019/0293730 A1* | 9/2019 | Chechendaev | G01R 33/022 |
| 2020/0039666 A1* | 2/2020 | Diaz Arias | B64G 1/409 |
| 2020/0136439 A1* | 4/2020 | Seong | B60L 53/38 |
| 2020/0144870 A1* | 5/2020 | Wright | H02J 50/80 |
| 2020/0180459 A1* | 6/2020 | Nagata | B60L 53/38 |
| 2020/0259375 A1* | 8/2020 | Hemphill | B60L 53/36 |
| 2020/0337162 A1* | 10/2020 | Perkins | G01S 5/0226 |
| 2021/0080534 A1* | 3/2021 | Erad | G01S 3/043 |
| 2021/0088569 A1* | 3/2021 | Tang | H01Q 3/267 |
| 2021/0099276 A1* | 4/2021 | Watson | H01Q 1/246 |

FOREIGN PATENT DOCUMENTS

| | | |
|---|---|---|
| WO | 2015191193 A1 | 12/2015 |
| WO | 2016099806 A1 | 6/2016 |
| WO | 2016099807 A1 | 6/2016 |

* cited by examiner

PRIMARY ASSEMBLY FOR USE IN A WIRELESS POWER TRANSMISSION SYSTEM, POSITIONING SYSTEM, AND METHOD OF DETERMINING A DISTANCE BETWEEN A PRIMARY ASSEMBLY AND A SECONDARY ASSEMBLY

This patent application is a national phase filing under section 371 of PCT/EP2017/068384, filed Jul. 20, 2017.

TECHNICAL FIELD

The present application refers to a primary assembly for use in a wireless power transmission system, a positioning system, and a method of determining a distance between a primary assembly and a secondary assembly.

BACKGROUND

The present application refers to the field of wireless power transmission. In such systems, a primary assembly and a secondary assembly should be aligned and therefore, the position and orientation of the secondary assembly relative to the primary assembly should be known.

In a primary assembly of a system of wireless power transmission, a transmission coil or a system of transmission coils can be provided. In a secondary assembly, a reception coil or a plurality of reception coils can be provided. Electromagnetic power such as magnetic power can be transferred from the primary assembly to the secondary assembly by induction from a primary coil of the primary assembly. If the secondary assembly having the secondary coil is in the vicinity of the primary coil, then the secondary coil can receive the magnetic power and convert it to electric energy. Utilizing such systems, electric power can be transferred wirelessly, e.g., to charge battery of a wireless communication device or the battery of an electric vehicle.

To reduce transmission losses, the primary assembly and the secondary assembly should be aligned with respect to each other.

The primary assembly can be an assembly solidly mounted to a fixed position, e.g., a charging position at a parking area. The secondary assembly can be mounted to the electric vehicle and electrically connected to the vehicle's circuitry.

Thus, for optimal power transfer, the positioning of the secondary assembly in the vicinity of the primary assembly, e.g., directly above the primary assembly, is wanted and a possible misalignment should be as small as possible.

The corresponding positioning system may operate simultaneously with the wireless power transfer operation and should be immune to its presence.

From the patent publications WO 2016/099807 A1 and US patent publication 2015/0094887 A1, positioning systems utilizing radar transceivers or transmission coils are known.

However, known systems are either complex and strongly increase manufacturing costs or not very accurate.

SUMMARY OF THE INVENTION

Embodiments provide a positioning system that is reliable, accurate and producible with low additional costs.

The primary assembly can be used in a wireless power transmission system. The primary assembly comprises a first antenna and a second antenna. The first antenna is provided to determine a distance between the first antenna and a circuit component of a secondary assembly. The secondary assembly may be used for or may be part of a wireless power transmission system. The second antenna is provided to determine a distance between the second antenna and the circuit component of the secondary assembly.

The number of antennas is not limited. The primary assembly can have further antennas.

The primary assembly may be the assembly of a wireless power transmission system that is localized at a fixed position, e.g., at a parking area. The primary assembly may be the transmitting part of a wireless power transmission system.

The secondary assembly may be the assembly that is used for receiving transmitted energy and can be connected to or be a part of an electric vehicle or, in general, an electrical device that should be provided with energy without the need for a cable connection.

Thus, the primary assembly can be a ground assembly and the secondary assembly can be a vehicle assembly.

The circuit component of the secondary assembly and the first antenna and the second antenna of the primary assembly should work together to determine the distance between the primary assembly and the secondary assembly. If the distance between the primary assembly and the secondary assembly is known, then the corresponding wireless power transmission system can determine whether electromagnetic power can be transferred from the primary assembly to the secondary assembly or not. Further, if the distance is known, then measures can be performed to bring the secondary assembly to the primary assembly.

In general, if the distance between the circuit component of the secondary assembly and the first antenna of the primary assembly is known, then it is clear that the primary assembly is located on a spherical surface around the secondary assembly. To be more precise: if the distance between the circuit component of the secondary assembly and the first antenna of the primary assembly is known and if the distance between the circuit component of the secondary assembly and the second antenna of the primary assembly is known, then the circuit component of the secondary assembly is at an intersection of a first spherical surface around the first antenna of the primary assembly and a second spherical surface of the second antenna of the primary assembly.

If it is assumed that the primary assembly is at a fixed location at a parking area and the secondary assembly is mounted to an electric vehicle that drives on a road and moves in two dimensions, then the position of the circuit component of the secondary assembly can be limited to two intersecting points of two circles around the first antenna and the second antenna, respectively.

Thus, it is possible that the primary assembly further comprises a third antenna that is provided to determine a distance between the third antenna and the circuit component of the secondary assembly.

With the knowledge of the distance between the circuit component of the secondary assembly and the third antenna of the primary assembly, the exact position of the circuit component of the secondary assembly can be determined.

Compared to conventional positioning systems, the provision of two or three coils at the primary assembly and an additional circuit component at the secondary assembly allows a high precision at low costs and a high reliability.

It is possible that the antenna or the antennas of one of the assemblies selected from the primary assembly and the secondary assembly emits a signal while the antenna or the antennas of the respective other assembly receives the transmitted signal.

Thus, it is possible that the first antenna and the second antenna and—if present, the third antenna—are reception antennas and the circuit component of the secondary assembly is a transmission antenna.

When the transmission antenna, e.g., of the secondary assembly, iteratively emits a signal that is received by the antennas of the primary assembly, then the distance between the secondary assembly (to be more precise: the antenna of the secondary assembly) and the primary assembly can be monitored iteratively.

The signal can be an electromagnetic signal.

The distance between the circuit component of the secondary assembly and the antennas of the primary assembly can be determined by evaluating the signal strength at the position of the respective reception antenna.

It is possible that the first antenna and the second antenna comprise a resonance circuit. The respective resonance circuit of an antenna can include an inductive element and a capacitive element. The inductive element and the capacitive element can be electrically connected, e.g., in series or in parallel to each other.

Also, the circuit component of the secondary assembly can comprise a resonance circuit having an inductive element and a capacitive element connected in series or in parallel.

The inductivity of the inductive elements and the capacity of the capacitive elements can be chosen to set the resonance frequencies of the corresponding resonance circuits to a common value.

The resonance frequency can be between 50 kHz and 50 MHz, e.g., 125 kHz.

The signal transmitted by the circuit component of the secondary assembly can be a square wave signal.

It is possible that the primary assembly further comprises a first rectifier, a second rectifier and an evaluation circuit. The first rectifier is electrically connected to the first antenna and to the evaluation circuit, the second rectifier is electrically connected to the second antenna and to the evaluation circuit. The rectifier is provided to transmit a first signal and a second signal to the evaluation circuit.

It is possible that the primary assembly comprises one rectifier per antenna.

The rectifier can receive an electric signal provided by the respective antennas. The rectifier can rectify each electric signal and provides the rectified signal to the evaluation circuit.

The electromagnetic energy of an electromagnetic signal is mainly proportional to the square of the voltage induced by the antenna. Further, the electromagnetic power received by an antenna is mainly reciprocal to the square value of the distance between the transmitter and the receiver. Thus, a voltage provided from a reception antenna to the rectifier is mainly reciprocal to the distance between the corresponding reception antenna and the circuit component of the secondary assembly emitting the signal. Correspondingly, the rectified signal is a measure for the corresponding distance that is submitted to the evaluation circuit. Utilizing triangulation or similar methods based on the knowledge concerning the distances between the circuit components of the secondary assembly and each antenna of the primary assembly, the evaluation circuit can determine the distance between the circuit component of the secondary assembly and the primary assembly.

Correspondingly, it is possible that the first signal is a voltage signal that is a measure for the distance between the first antenna and the circuit element of the secondary assembly and the second signal is a voltage signal that is a measure for the distance between the second antenna and the circuit element of the secondary assembly.

It is possible that the primary assembly is provided for use in a wireless power transmission system comprising a primary coil provided to transmit electromagnetic power to a secondary coil. The secondary coil is the receiving coil of the system. The secondary coil may be part of the secondary assembly. Or the secondary assembly and the secondary coil may be parts of a reception system being part of the wireless power transfer system.

A positioning system comprises a primary assembly, e.g., as described above, and a secondary assembly, e.g., as described above. Thus, the secondary assembly can have an antenna as a circuit element and a secondary coil provided to receive electromagnetic power from the primary assembly or to transmit electromagnetic power to the primary assembly.

Thus, the terminology is such that the primary coil is associated with the primary assembly and the secondary coil is associated with the secondary assembly. One possible function of the primary coil is to transmit power to the secondary coil. However, the opposite direction is also possible: the secondary coil can be used to transmit power to the primary coil, too.

If the positioning system notifies that the distance between the primary assembly and the secondary assembly is sufficiently small, then the power transfer from the primary assembly, which may be a ground assembly, to the secondary assembly, which may be a vehicle assembly, can be started.

It is possible that the positioning system and/or the secondary assembly comprise a fifth antenna and/or a sixth antenna in the secondary assembly.

By evaluating distances between additional antennas of the secondary assembly and the antennas of the primary assembly, not only the distance between the secondary assembly and the primary assembly but also the orientation of the secondary assembly relative to the primary assembly can be determined.

This is especially useful if information obtained from the positioning system shall be used to navigate the secondary assembly to the primary assembly because then, an optimal direction to navigate the secondary assembly to the primary assembly can be determined. A method of determining a distance between a primary assembly of a wireless power transmission system and a secondary assembly of the wireless power transmission system comprises the steps:

transmitting a first signal from a circuit component of the secondary assembly, receiving the first signal with a first antenna of the primary assembly, receiving the first signal with a second antenna of the primary assembly, determining a first distance between the circuit component of the secondary assembly and the first antenna by evaluating the signal strength of the first signal at the position of the first antenna, determining a second distance between the circuit component of the secondary assembly and the second antenna by evaluating the signal strength of the first signal at the position of the second antenna, and determining the position and orientation of a secondary coil based on the first and the second distance and the angle of two directions.

Of course, if the primary assembly has one or more additional antennas and if the secondary antenna has one or more additional antennas, then additional steps of transmitting, receiving and evaluating can be performed.

In particular, it is preferred that the primary assembly has four antennas to increase redundancy and to improve evaluation of the distances.

It is possible that the method further comprises the steps:
receiving the first signal with a third antenna of the primary assembly,
determining a third distance between the circuit component of the secondary assembly and the third antenna by evaluating the signal strength of the first signal at the position of the third antenna, and
determining the distance between the primary assembly and the secondary assembly by evaluating the first distance, the second distance, and the third distance.

Thus, by utilizing triangulation by the evaluation circuit, the precise distance between the transmission antenna of the secondary assembly and the primary assembly can be determined while only circuit components need to be added to the assemblies that increase manufacturing costs to a small amount.

BRIEF DESCRIPTION OF THE DRAWINGS

Working principles and details of preferred embodiments are explained and provided by the schematic figures.

In the figures.

DETAILED DESCRIPTION OF ILLUSTRATIVE EMBODIMENTS

Figure 1:
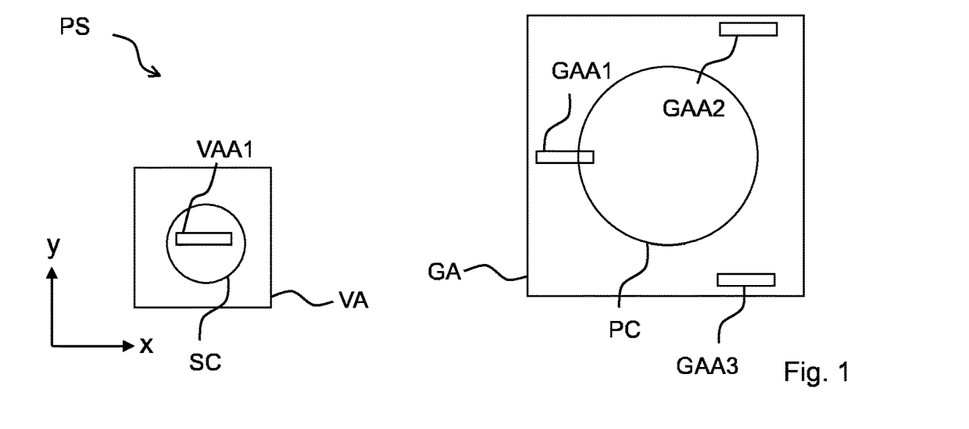
FIG. 1 shows a possible arrangement of a vehicle assembly near a ground assembly.

FIG. 1 shows a typical initial state of a secondary assembly realized by a vehicle assembly VA in the vicinity of a primary assembly realized by a ground assembly GA. The positioning system shall help bringing the vehicle assembly VA to the ground assembly GA. It is assumed that the vehicle assembly VA is mounted to a vehicle that can be moved in two dimensions, that is in the xy-plain. The vehicle assembly VA may have a secondary coil SC and the ground assembly GA may have a primary coil PC. The primary coil PC and the secondary coil SC should be utilized to transmit magnetic power from the ground assembly GA to the vehicle assembly VA, e.g., to charge the vehicle's battery. To that end, the secondary coil must be brought to and aligned to the primary coil PC.

The vehicle assembly VA has a first antenna VAA1 that can continuously or iteratively emit an electromagnetic signal. The ground assembly GA has a first antenna GAA1, a second antenna GAA2 and a third antenna GAA3. Each of the antennas of the ground assembly GA receives the signal or the signals transmitted by the antenna VAA1 of the vehicle assembly VA. By evaluating the signal, e.g., by evaluating the signal strength at the corresponding position of the reception antenna, the distance between the vehicle assembly VA and the ground assembly GA can be determined.

Figure 2:
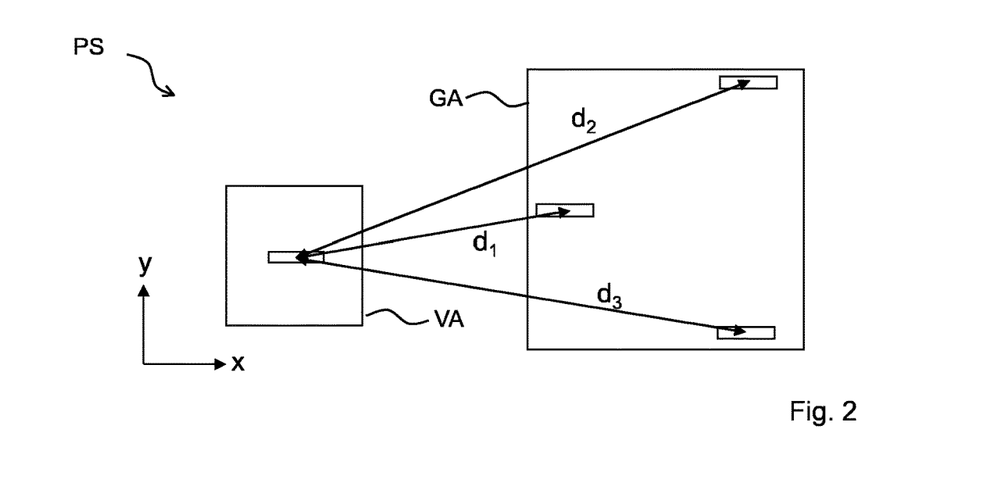
FIG. 2 shows the relevant distances between the circuit component of the vehicle assembly and the antennas of the ground assembly.

FIG. 2 shows the relevant distances of the positioning system PS, i.e., a first distance between the antenna of the vehicle assembly VA and the first antenna of the ground assembly GA. The second distance D2 is the distance between the antenna of the vehicle assembly VA and the second antenna of the ground assembly GA, and the third distance D3 is the distance between the antenna of the vehicle assembly and the third reception antenna of the ground assembly GA.

Figure 3:
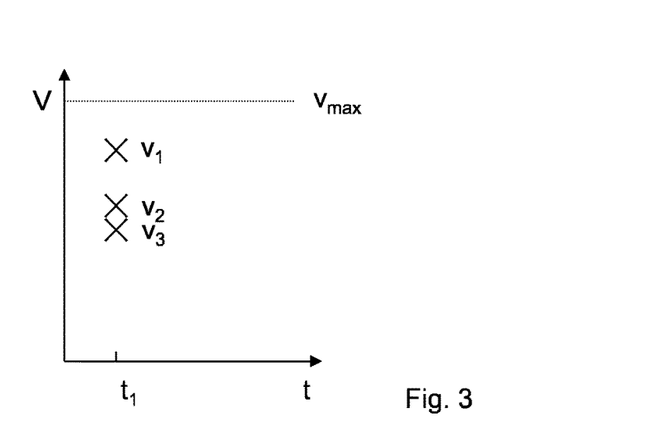
FIG. 3 shows voltage signals provided at a specified time.

FIG. 3 illustrates corresponding voltage levels that correspond to the distances D1, D2, D3 in FIG. 2. The maximum voltage is limited by the shortest possible distance between the transmission antenna of the vehicle assembly and the reception antenna of the ground assembly.

Figure 4:
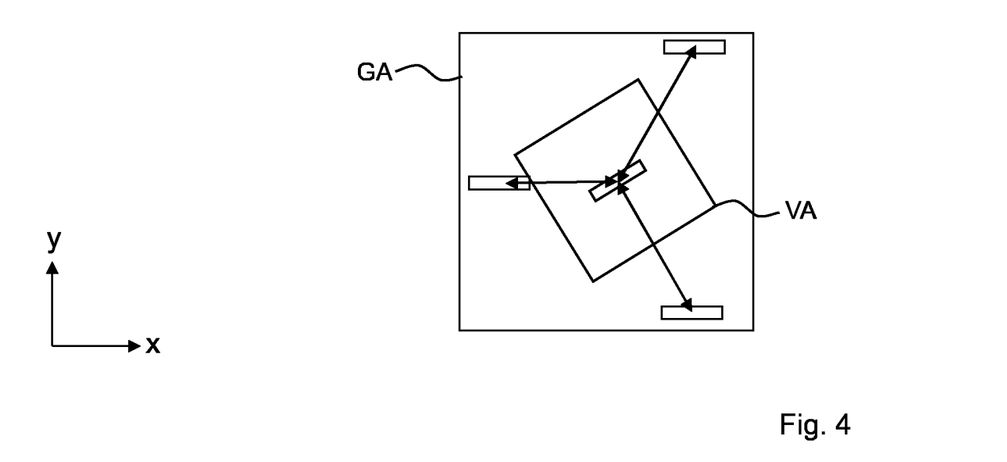
FIG. 4 shows the vehicle assembly at the position of the ground assembly.

FIG. 4 illustrates a final position of the vehicle assembly VA directly over the ground assembly GA after guiding an electric vehicle to its charging position. However, the orientation of the vehicle can still be improved.

Figure 5:
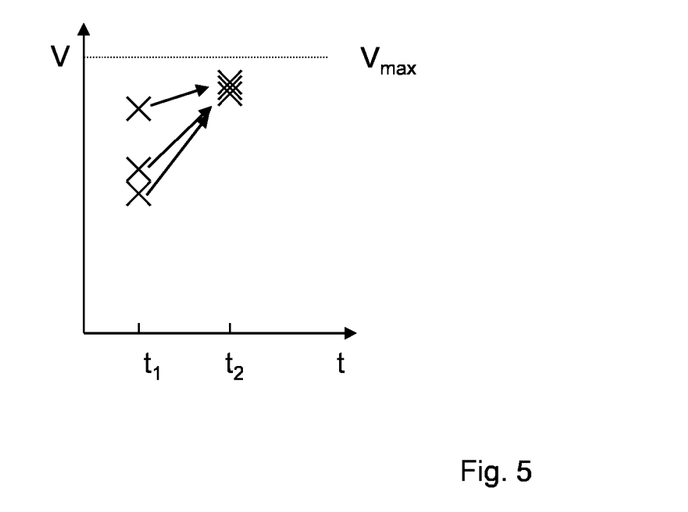
FIG. 5 shows the temporal development of the voltage signals during an approach.

FIG. 5 shows the corresponding temporal development of voltage signals from an initial time T1 to the final time T2. The vehicle is moved towards the ground assembly in such a way that the determined distance is reduced. The final position may be reached when the sum of the voltage signals has reached a maximum.

Figure 6:
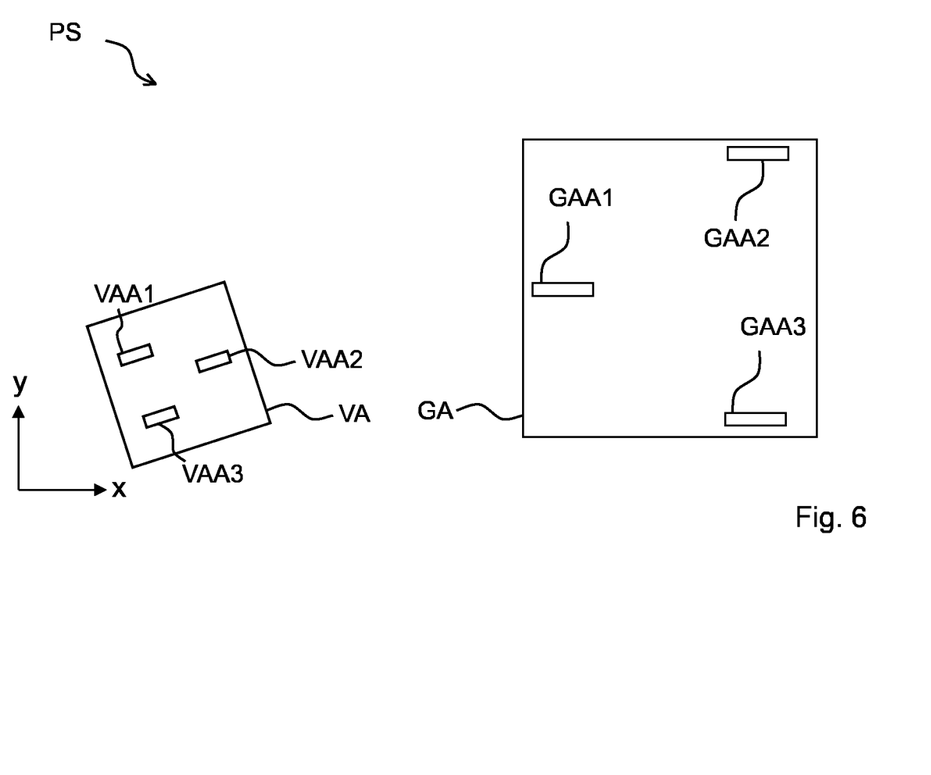
FIG. 6 shows a vehicle assembly comprising three antennas.
Figure 7:
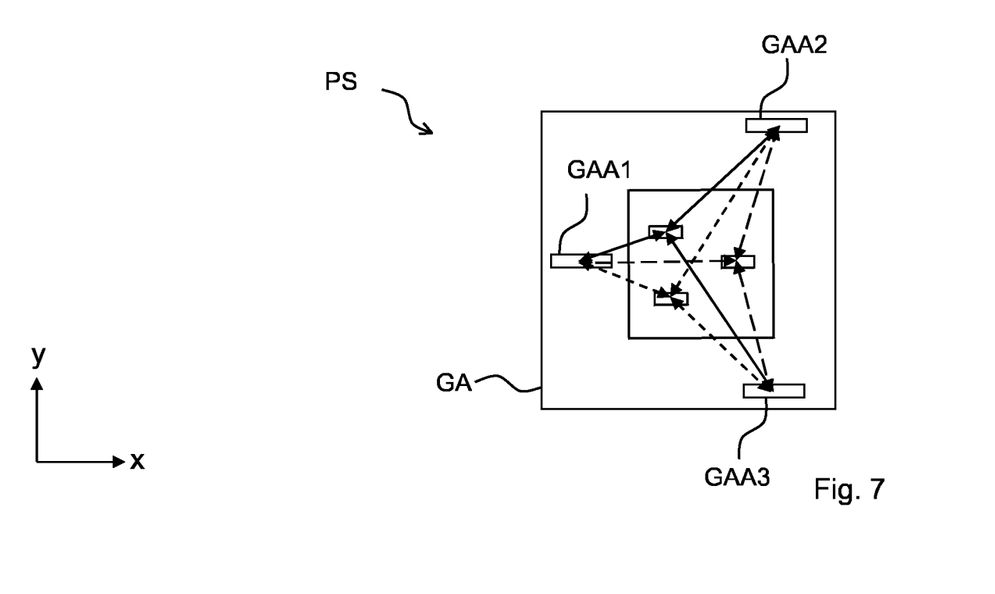
FIG. 7 shows the final state where the vehicle assembly is not only brought to the position of the ground assembly but also aligned with the ground assembly.

FIG. 6 shows a vehicle assembly VA having three transmission antennas. With two or more transmission antennas at the vehicle assembly site, not only the distance between the vehicle assembly and the ground assembly GA can be determined. Further, the orientation of the vehicle assembly VA relative to the ground assembly GA can be determined. Thus, as a consequence thereof, FIG. 7 shows a final stage of an approach process where the vehicle assembly is precisely positioned over the ground assembly and where the vehicle assembly is precisely arranged relative to the ground assembly. By evaluating the distances between each of the antennas of the vehicle assembly and each of the antennas of the ground assembly, a precise determination of the position and a precise determination of the orientation can be obtained.

Figure 8:
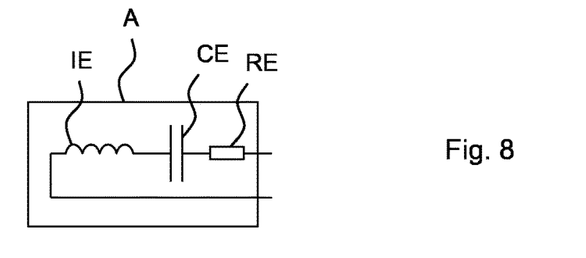
FIG. 8 shows a possible composition of circuit elements in a series resonance circuit.

FIG. 8 shows possible details of a preferred transmission or reception antenna having an inductive element IE a capacitive element CE and a resistive element RE in the antenna A. The inductive element IE and the capacitive element CE are electrically connected in series and form a series resonance circuit.

Figure 9:
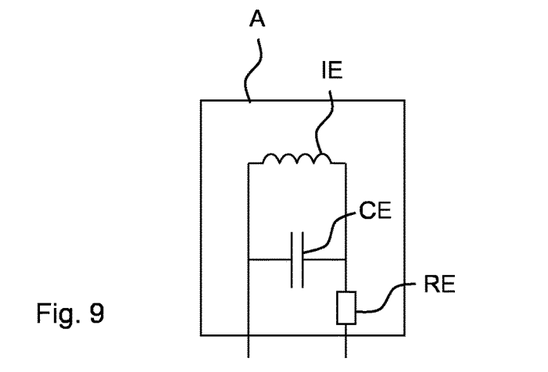
FIG. 9 shows a possible arrangement of circuit elements in a parallel resonance circuit.

FIG. 9 shows an alternative preferred embodiment of a reception or a transmission antenna A where the inductive element IE and the capacitive element CE are electrically connected in parallel to form the parallel resonance circuit. The parallel circuit is connected in series with a resistive element.

The inductances of the inductance elements of the antennas and the capacities of the capacitive elements of the antennas are chosen such that the corresponding resonance frequency of the resonance circuit matches a common resonance frequency that may be around 125 kH.

Figures 10, 11:
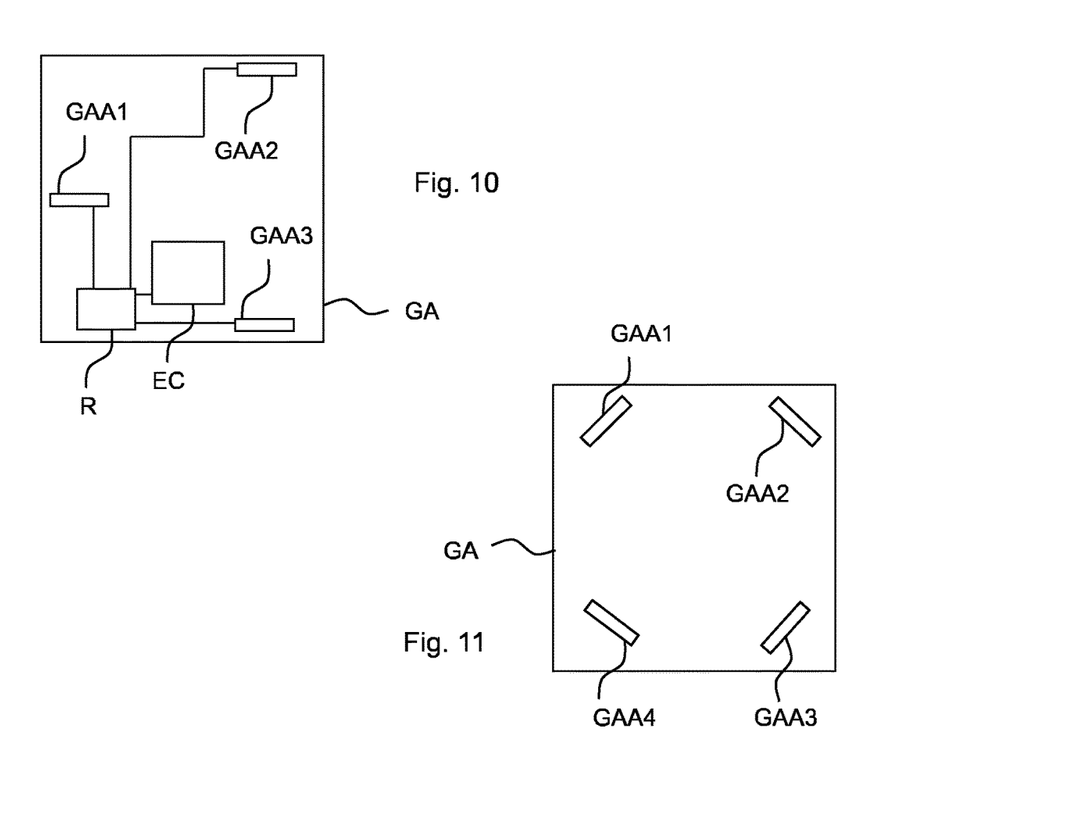
FIG. 10 shows the working principle of the rectifier and the evaluation circuit.
FIG. 11 shows an embodiment of the ground assembly with four antennas.

FIG. 10 shows further details of the ground assembly GA having a rectifier R and an evaluation circuit EC. The rectifier R receives information, e.g., voltage information, from the antennas of the ground assembly GA and provides corresponding distance information that may be encoded as a voltage to the evaluation circuit EC. The evaluation circuit EC may comprise amplifiers and integrated circuits to perform the necessary calculations to convert voltage information to distance information that can be provided to a routing system that leads the vehicle to the ground assembly.

FIG. 11 shows a preferred embodiment where the ground assembly GA has four reception antennas.

The assemblies and the positioning system and the methods described above are not limited to the stated technical details. Assemblies can comprise further circuit elements. The positioning system can comprise further assemblies and circuit elements and the methods can comprise further steps.

The invention claimed is:

1. A primary assembly for a wireless power transmission system, the primary assembly comprising:
   a first antenna;
   a second antenna; and
   a third antenna,
   wherein the first antenna is configured to determine a first distance between the first antenna and a circuit component of a secondary assembly for the wireless power transmission system,
   wherein the second antenna is configured to determine a second distance between the second antenna and the circuit component of the secondary assembly, and
   wherein the third antenna is configured to determine a third distance between the third antenna and the circuit component of the secondary assembly.

2. The primary assembly of claim 1,
   wherein the first antenna and the second antenna are reception antennas, and
   wherein the circuit component of the secondary assembly is a transmission antenna.

3. The primary assembly of claim 1, wherein the first antenna and the second antenna comprise a resonance circuit including an inductive element and a capacitive element electrically connected in series or parallel to the inductive element.

4. The primary assembly of claim 1, further comprising a first rectifier, a second rectifier and an evaluation circuit, wherein the first rectifier is electrically connected to the first antenna and to the evaluation circuit, wherein the second rectifier is electrically connected to the second antenna and to the evaluation circuit, and wherein the first and second rectifiers are configured to transmit a first signal and a second signal to the evaluation circuit.

5. The primary assembly of claim 4,
   wherein the first signal is a voltage signal that is a measure for the first distance between the first antenna and a circuit element of the secondary assembly, and
   wherein the second signal is a voltage signal that is a measure for the second distance between the second antenna and the circuit element of the secondary assembly.

6. The primary assembly of claim 1, wherein the primary assembly comprises a primary coil configured to transmit electromagnetic power to a secondary coil of the secondary assembly.

7. A positioning system comprising:
   the primary assembly according to claim 1; and
   the secondary assembly comprising a forth antenna as the circuit component and a secondary coil configured to receive electromagnetic power from the primary assembly or to transmit electromagnetic power to the primary assembly.

8. The positioning system according to claim 7, further comprising a fifth antenna and/or sixth antenna in the secondary assembly.

9. A method for determining a distance between a primary assembly of a wireless power transmission system and a secondary assembly of the wireless power transmission system, the method comprising:
   transmitting a first signal from a circuit component of the secondary assembly;
   receiving the first signal with a first antenna of the primary assembly;
   receiving the first signal with a second antenna of the primary assembly;
   receiving the first signal with a third antenna of the primary assembly;
   determining a first distance between the circuit component of the secondary assembly and the first antenna by evaluating a signal strength of the first signal at a position of the first antenna;
   determining a second distance between the circuit component of the secondary assembly and the second antenna by evaluating the signal strength of the first signal at a position of the second antenna;
   determining a third distance between the circuit component of the secondary assembly and the third antenna by evaluating the signal strength of the first signal at a position of the third antenna;
   determining a position and an orientation of a secondary coil based on the first and second distances and an angle of two directions; and
   determining the distance between the primary assembly and the secondary assembly by evaluating the first distance, the second distance and the third distance.

10. A primary assembly for a wireless power transmission system, the primary assembly comprising:
    a first antenna;
    a second antenna;
    a first rectifier;
    a second rectifier; and
    an evaluation circuit,
    wherein the first antenna is configured to determine a first distance between the first antenna and a circuit component of a secondary assembly for the wireless power transmission system,
    wherein the second antenna is configured to determine a second distance between the second antenna and the circuit component of the secondary assembly,
    wherein the first rectifier is electrically connected to the first antenna and to the evaluation circuit,
    wherein the second rectifier is electrically connected to the second antenna and to the evaluation circuit, and
    wherein the first and second rectifiers are configured to transmit a first signal and a second signal to the evaluation circuit.

11. The primary assembly of claim 10, wherein the first antenna and the second antenna are reception antennas, and wherein the circuit component of the secondary assembly is a transmission antenna.

12. The primary assembly of claim 10, wherein the first antenna and the second antenna comprise a resonance circuit including an inductive element and a capacitive element electrically connected in series or parallel to the inductive element.

13. The primary assembly of claim 10, wherein the primary assembly comprises a primary coil configured to transmit electromagnetic power to a secondary coil of the secondary assembly.

14. A positioning system comprising:
the primary assembly according to claim 10; and
the secondary assembly comprising a fourth antenna as the circuit component and a secondary coil configured to receive electromagnetic power from the primary assembly or to transmit electromagnetic power to the primary assembly.

15. The positioning system according to claim 14, further comprising a fifth antenna and a sixth antenna in the secondary assembly.

16. The primary assembly of claim 10,
wherein the first signal is a voltage signal that is a measure for the first distance between the first antenna and a circuit element of the secondary assembly, and
wherein the second signal is a voltage signal that is a measure for the second distance between the second antenna and the circuit element of the secondary assembly.

17. The primary assembly of claim 16,
wherein the first antenna and the second antenna are reception antennas, and
wherein the circuit component of the secondary assembly is a transmission antenna.

18. The primary assembly of claim 16, wherein the first antenna and the second antenna comprise a resonance circuit including an inductive element and a capacitive element electrically connected in series or parallel to the inductive element.

19. The primary assembly of claim 16, wherein the primary assembly comprises a primary coil configured to transmit electromagnetic power to a secondary coil of the secondary assembly.

20. A positioning system comprising:
the primary assembly according to claim 16; and
the secondary assembly comprising an antenna as the circuit component and a secondary coil configured to receive electromagnetic power from the primary assembly or to transmit electromagnetic power to the primary assembly, wherein the secondary assembly comprises a fifth antenna and a sixth antenna.

* * * * *